(12) United States Patent
Smeltzer, III et al.

(10) Patent No.: US 8,697,216 B2
(45) Date of Patent: Apr. 15, 2014

(54) SYSTEMS, APPARATUSES, AND METHODS FOR USING DURABLE ADHESIVELY BONDED JOINTS FOR SANDWICH STRUCTURES

(75) Inventors: Stanley S. Smeltzer, III, Smithfield, VA (US); Eric C. Lundgren, Hermosa Beach, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 378 days.

(21) Appl. No.: 13/198,817

(22) Filed: Aug. 5, 2011

(65) Prior Publication Data
US 2012/0034408 A1 Feb. 9, 2012

Related U.S. Application Data

(60) Provisional application No. 61/370,853, filed on Aug. 5, 2010.

(51) Int. Cl.
| | |
|---|---|
| *B32B 3/06* | (2006.01) |
| *B32B 37/12* | (2006.01) |
| *B32B 37/14* | (2006.01) |
| *B32B 3/08* | (2006.01) |

(52) U.S. Cl.
USPC ............... 428/53; 428/54; 428/55; 428/57; 428/58; 428/101

(58) Field of Classification Search
USPC .............. 428/53, 54, 55, 57, 58, 98, 101
See application file for complete search history.

(56) References Cited

U.S. PATENT DOCUMENTS

| | | | |
|---|---|---|---|
| 4,793,727 A * | 12/1988 | Schmaling | ............... 403/340 |
| 4,858,853 A | 8/1989 | Westerman et al. | |
| 5,626,934 A | 5/1997 | Brewer | |
| 5,664,518 A | 9/1997 | Lewit et al. | |
| 6,361,055 B1 | 3/2002 | Grover | |
| 6,680,099 B1 | 1/2004 | Brewer | |
| 2009/0116898 A1 | 5/2009 | Wanthal | |
| 2010/0065688 A1 | 3/2010 | Wood | |

OTHER PUBLICATIONS

Eric C. Lundgren, Stanley S. Smeltzer, III, and Rakesh K. Kapania, "Durable Joining Technology for Uniformly-Curved Composite Sandwich Structures", 51st AIAA/ASME/ASCE/AHS/ASC Structures, Structural Dynamics, and Materials Conference Apr. 12-15, 2010, Orlando, Florida.

(Continued)

*Primary Examiner* — Brent O'Hern
(74) *Attorney, Agent, or Firm* — Jennifer L. Riley (57) ABSTRACT

Systems, methods, and apparatus for increasing durability of adhesively bonded joints in a sandwich structure. Such systems, methods, and apparatus includes an first face sheet and an second face sheet as well as an insert structure, the insert structure having a first insert face sheet, a second insert face sheet, and an insert core material. In addition, sandwich core material is arranged between the first face sheet and the second face sheet. A primary bondline may be coupled to the face sheet(s) and the splice. Further, systems, methods, and apparatus of the present disclosure advantageously reduce the load, provide a redundant path, reduce structural fatigue, and/or increase fatigue life.

16 Claims, 9 Drawing Sheets

(56) References Cited

OTHER PUBLICATIONS

Lee, M.C.W., Mikulik, Z., Kelly, D.W., Thomson, R.S., and Degenhardt, R., "Robust Design—A Concept for Imperfection Insensitive Structures," Composite Structures, 2009, doi:10.1016/j.compstruct.2009.09.054.

Hanson, B. "Design, Analysis and Certification of F-35 Bonded Control Surfaces," Technical Presentation, Dec. 2008.

Bahei-El-Din, Y.A., and Dvorak, G.J., "New Designs of Adhesive Joints for Thick Composite Laminates," Composites Science and Technology, vol. 61, 2001, pp. 19-40.

Turaga, U.V.R.S., and Sun, C.T., "An Investigation of Adhesive Single-Lap Joints with Attachments", AIAA Paper 2003-1957. Apr. 2003.

Stanley S. Smeltzer, III, and Eric Lundgren, "Analytical and Numerical Results for an Adhesively Bonded Joint Subjected to Pure Bending" AIAA Paper 2006-1960, May 2006.

\* cited by examiner

SYSTEMS, APPARATUSES, AND METHODS FOR USING DURABLE ADHESIVELY BONDED JOINTS FOR SANDWICH STRUCTURES

CROSS-REFERENCE TO RELATED APPLICATIONS

The present application claims priority under the laws and rules of the United States, including 35 USC §120, to U.S. Provisional Patent Application No. 61/370,853 filed on Aug. 5, 2010. The contents of U.S. Provisional Patent Application No. 61/370,853 are herein incorporated by reference.

STATEMENT REGARDING FEDERALLY SPONSORED RESEARCH AND DEVELOPMENT

This invention was made in part with Government support. The Government may have certain rights in this invention.

BACKGROUND

Heavy lift cargo vehicles including aerospace vehicles such as rocket launch vehicles can be made of composite materials. Composite technology used in such heavy lift cargo vehicles may use adhesive bonded joints or mechanically fastened (bolted) configurations to join one or more composite panels or structures. Adhesively bonded joints are efficient joining methods for launch vehicle structures compared with mechanically fastened (bolted) configurations. This efficiency of adhesively bonded joints is primarily due to their inherent capability to distribute loads in a fairly uniform manner along an interface, while the use of bolted joints introduces stress concentrations and penetrations through the use of fasteners. Thus, the same general loading is transferred from one structure to another in a more mass-efficient manner by a thin layer of adhesive when compared to the discrete bolt pattern required for the same joint interface. Further, composites are particularly well suited to joining components through bonding due to their fabrication and processing methods that allow joints to be an integral part of the cure process for composite materials. However, adhesive bonded joints are susceptible to manufacturing defects that result in a failure between the adhesive and a surface. Such manufacturing defects may significantly decrease the load carrying capability of the adhesive joint. Hence, in some applications, mechanical configurations for the joints of composites structures may be preferred.

BRIEF SUMMARY

Embodiments of the disclosure describe a durable adhesively bonded joint for sandwich and composite structure panels providing redundant load paths to overcome manufacturing defects of the adhesive layer to a surface. Thus, such a joint may be called a durable redundant joint (DRJ). A preform insert may be used to enable the joint to have one or more redundant load paths. Further, the sandwich structure panels may, in some preferred instances, be of a curved or sandwich architecture.

Further embodiments of the present disclosure include an apparatus for increasing durability of adhesively bonded joints in a sandwich structure. The apparatus may include a first face sheet and a second face sheet as well as an insert structure having a first insert face sheet, a second insert face sheet, and an insert core material. The apparatus may further include sandwich core material that is arranged between the first face sheet and the second face sheet. In addition, the insert core material may have a recessed area capable of holding a portion of the insert structure. The first face sheet may be coupled to a first splice by a first primary bondline and the first face sheet may be coupled to the first insert face sheet by a first redundant bondline. Alternatively, the second face sheet may be coupled to a second splice by a second primary bondline and the second face sheet may be coupled to the second insert face sheet by a second redundant bondline. The first redundant bondline may reduce a load on the first primary bondline and the second redundant bondline may reduce a load on the second primary bondline.

Instead of incorporating one-insert structures to the apparatus, the apparatus may incorporate one or more insert structures, each of which is coupled and substantially perpendicular to both the first insert face sheet and the first insert face sheet. The apparatus further includes an adhesive fillet included in the first primary bondline, the first redundant bondline, the first redundant bondline, and the first primary bondline.

Further, the exemplary apparatus may include the first redundant bondline providing a redundant load path for the load in the first face sheet. Further, the apparatus may include the second redundant bondline provides a redundant load path for the load in the second face sheet. In addition, a first redundant bondline is capable of reducing structural fatigue of the first splice of the joint by redistributing the load on the first primary bondline to the first redundant bondline and the insert structure. Also, the second redundant bondline is capable of reducing structural fatigue of the second splice of joint by redistributing the load on the second primary bondline to the second redundant bondline and the insert structure.

Additional embodiments of the present disclosure may include a system for increasing durability of adhesively bonded joints in a sandwich structure. Such a system may include one or more sandwich structures each sandwich structure having a first face sheet and a second face sheet as well as an insert structure. The insert structure having a first insert face sheet, a second insert face sheet, and an insert core material. Further, the system may include sandwich core material arranged between the first face sheet and the second face sheet, the core having a recessed area capable of holding a portion of the insert structure. The first face sheet may be coupled to a first splice by a first primary bondline and the first face sheet may be coupled to the first insert face sheet by a first redundant bondline. In addition, the second face sheet may be coupled to a second splice by a second primary bondline and the second face sheet may be coupled to the second insert face sheet by a second redundant bondline. The first redundant bondline reduces load on the first primary bondline and the second redundant bondline reduces a load on the second primary bondline.

Further, the system may include one or more insert structures, each coupled and substantially perpendicular to both the first insert face sheet and the second insert face sheet. Also, an adhesive fillet may be included in the first primary bondline, the first redundant bondline, the second redundant bondline, and the second primary bondline. The first redundant bondline provides a redundant load path for the load on the first primary bondline and the second redundant bondline provides a redundant load path for the load on the second primary bondline. In addition, first redundant bondline is capable of reducing structural fatigue of the joint by redistributing the load from the first splice to first face sheet of insert and the insert structure. Comparatively, the second redundant bondline is capable of reducing structural fatigue of the joint by redistributing the load on the second primary bondline to second redundant bondline and the insert structure.

The joint in such an exemplary system may be a coupling of a first sandwich structure to a second structure such that a first portion of the insert structure is surrounded by a first sandwich core material of the first sandwich structure and a second portion of the insert structure is surrounded by a second material of the second sandwich structure. Persons of ordinary skill in the art would understand that there may be various geometries of the one or more sandwich structures used in the different embodiment of the present disclosure such as curved sandwich structures and flat sandwich structure.

Other embodiments of the present disclosure may include a method for increasing durability of adhesively bonded joints in a sandwich structure that includes providing a first face sheet and a second face sheet, a first splice and a second splice, a sandwich core material and a first insert face sheet and a second insert face sheet and an insert core material. A further step may be arranging the sandwich core material between the first face sheet and the second face sheet. Additional steps may include coupling the first splice to the first face sheet using a first primary bondline as well as coupling the second splice to the second face sheet using a second primary bondline. Another set of steps may include arranging the insert core material between the first insert face sheet and the second insert face sheet. A further step may be coupling the first face sheet to the first insert face sheet using a first redundant bondline as well as coupling the second face sheet to the second insert face sheet using a second redundant bondline. An additional step may be reducing load on a primary bondline using a redundant bondline.

Another step in the exemplary method may include providing a redundant load path for the load on the primary bondline of one or more sandwich structures using the redundant bondline. A further step in such a method may be reducing structural fatigue of the joint by redistributing the load on the primary bondline to redundant bondline and the insert structure.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Next generation heavy lift cargo vehicles for air and space travel can be designed to be constructed with composite sandwich structures. The external sides of such vehicles may be comprised of curved or flat panel composite sandwich structures. Conventional techniques to join such panels include a conventional splice joint (CSJ) that may incorporate mechanical (bolted) configurations as well as adhesive joints. Although adhesive joints may provide greater structural efficiency, due to undetectable manufacturing defects in adhesive joints that may not be able to carry specified loads as well as conventional splice joints.

Next generation of heavy lift vehicles may include Orion, Ares and Ares V vehicles that delivery large-scale hardware and ferry supplies to the International Space Station. Future application of such vehicles may include missions to the moon and Mars, which may require the vehicles to transport lunar landing or other terrestrial vehicles. Thus, such vehicles may be comprised of composite, sandwich structures that may have either curved or flat panel geometry. Such panels may have a need to be joined using efficient, durable joints that includes structural efficiency and reliability.

Figure 1:
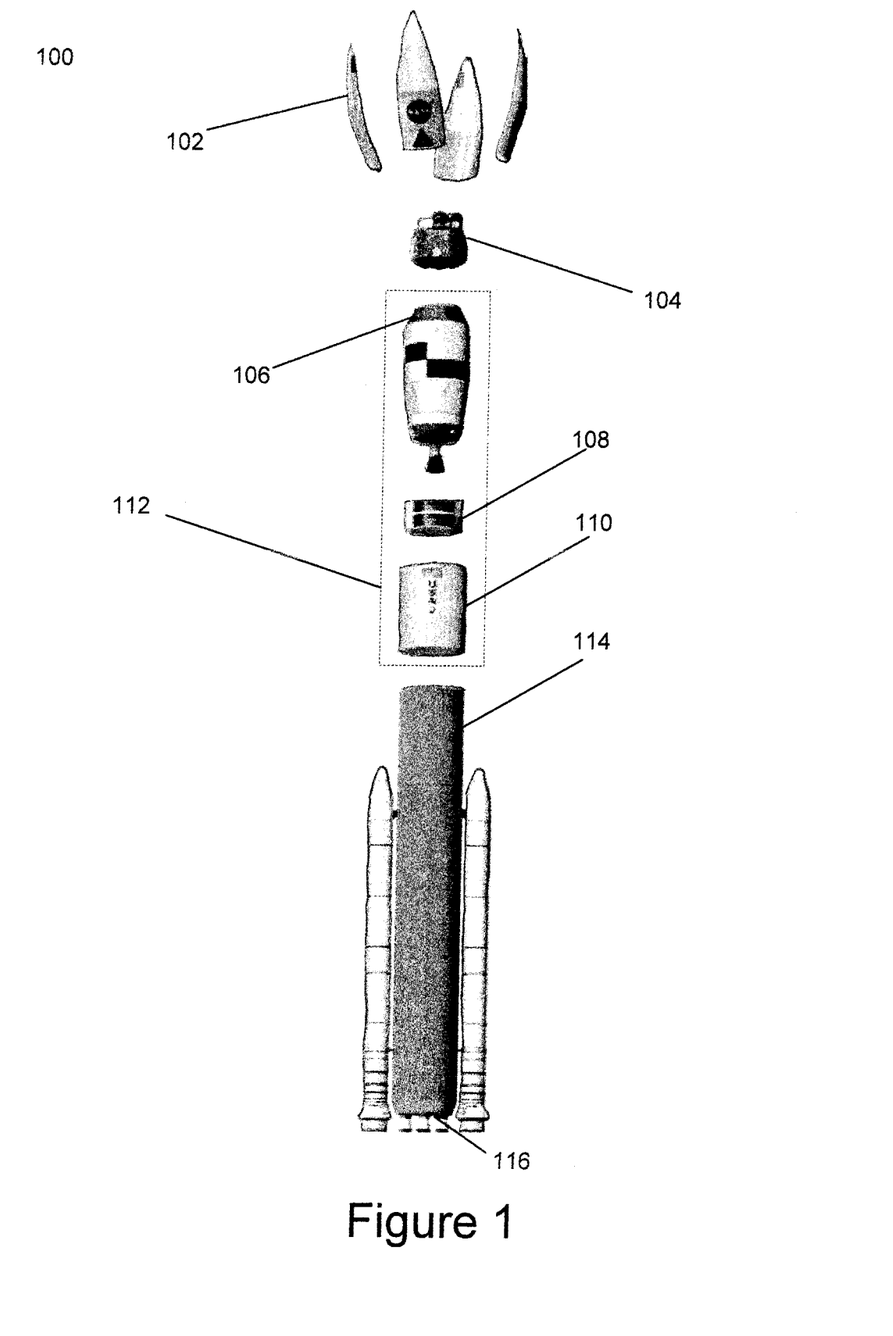
FIG. 1 is an exemplary vehicle that may incorporate composite sandwich structures according to aspects of the present disclosure.

FIG. 1 is an exemplary vehicle 100 that may incorporate composite sandwich structures according to aspects of the present disclosure. The exemplary vehicle 100 shown in FIG. 1 is an Ares V rocket 100 and includes several components such as a payload shroud 102, lunar lander 104, payload adapter 106, loiter skirt 108, interstage 110, and core stage 114. The payload adapter 106, loiter skirt 108 and interstage 110 are some of the components that comprise the Earth Departure Stage (EDS) 112. Further, the EDS 112 may include Saturn-derived J-2X LOX/LH$_2$ engines as well as aluminum-lithium tanks and the primary Ares V avionics system. The EDS 112 may be 10 m in diameter. The core stage 114 may include six Delta IV-derived RS-68B LOX/LH$_2$ engines 116 as well as aluminum-lithium tanks. In addition, the core stage 114 has two recoverable 5.5 segments, PBAN fueled, steel encased solid rocket boosters. The payload shroud 102 may be of biconic or give design.

The interstage component 110 of the Ares V rocket vehicle 100 may be comprised of curved composite, sandwich structures for its outer panels. Such curved composite, sandwich structures have a need to be joined to construct the interstage component of the Ares V rocket vehicle 100. However, the Instrument Unit of the payload shroud 102 and the EDS 112 as well as parts of the core stage 114 may also be comprised of composite sandwich structures that may have a need to be joined together.

Manufacturing of large-diameter structures having uniform curvature, applicable to the Ares V payload shroud 102, EDS 112 including the interstage 110 and the core stage 114, may require that the stack element be composed of a number of uniformly-curved sectors, joined longitudinally. One approach would be to strap the panel sectors together using splice plates to form a conventional splice joint (CSJ). Such an approach would likely incorporate mechanical fasteners to share the load due to the concerns for catastrophic failure associated with secondary-bonding of primary structures. However, a durable redundant joint (DRJ) as described in the present disclosure may also be used to join the curved, composite, sandwich structures.

Figure 2:
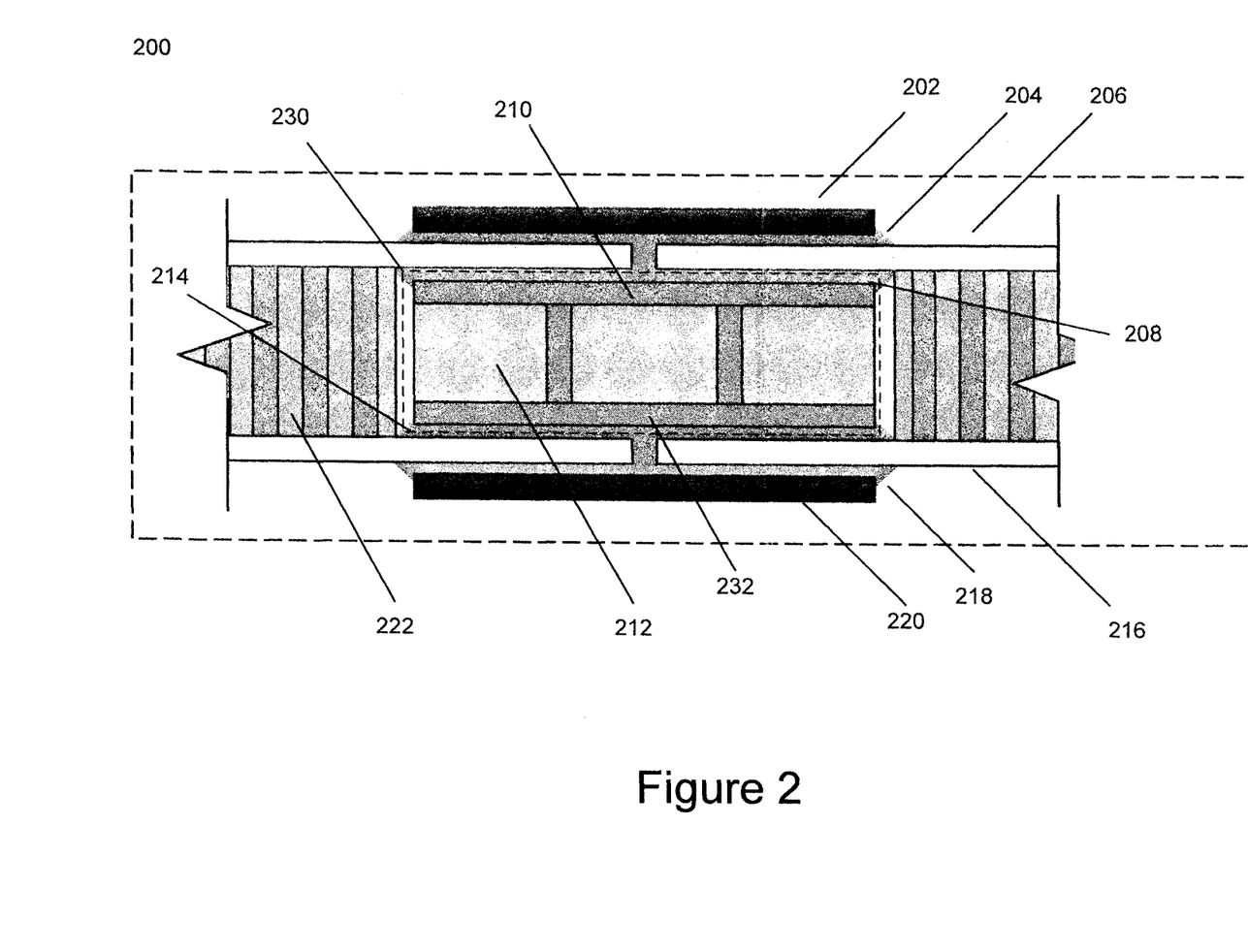
FIG. 2 is an exemplary block diagram of a durable redundant joint for joining composite sandwich structure according to aspects of the present disclosure.

FIG. 2 is an exemplary block diagram 200 of an example durable redundant joint for joining composite, sandwich structure according to aspects of the present disclosure. Generally, the example DRJ depicted in FIG. 2 reduces the load on each primary bondline by introducing an additional bondline. Specifically, a composite, sandwich structure may incorporate a sandwich core material 222 in between a first face sheet 206 and a second face sheet 216. In some embodiments, the sandwich core material 222 may be an aluminum honeycomb core structure. Further, the first face sheet 206 and a second face sheet 216 may be of solid laminate material. The durable redundant joint may comprise an insert structure 230 that may be constructed in I-beam geometry in an embodiment. The insert structure 230 may also have an insert core material 212 in between a first insert face sheet 210 and a second insert face sheet 232. The insert core material 212 may be of a dense foam material.

Further embodiments may be that all thicknesses of the insert face sheets (210 and 232) are identical in material (e.g. solid laminate), and are equal in thickness to the face-sheets (206 and 216) which make up the sandwich panels. In addition, the joint 200 may include a first splice plate 202 and a second splice plate 220. The splice plates may also share some of the same dimensions (e.g. thickness) as the panel and insert face sheets. Also, the joint 200 may have several bondlines that includes a first primary bondline 204, a second primary bondline 218, a first redundant bondline 208 and a second redundant bondline 214. All bondline thicknesses may be equal. Fillets of adhesive material, called spew-fillets, may also be introduced at each bondline.

Figure 3:
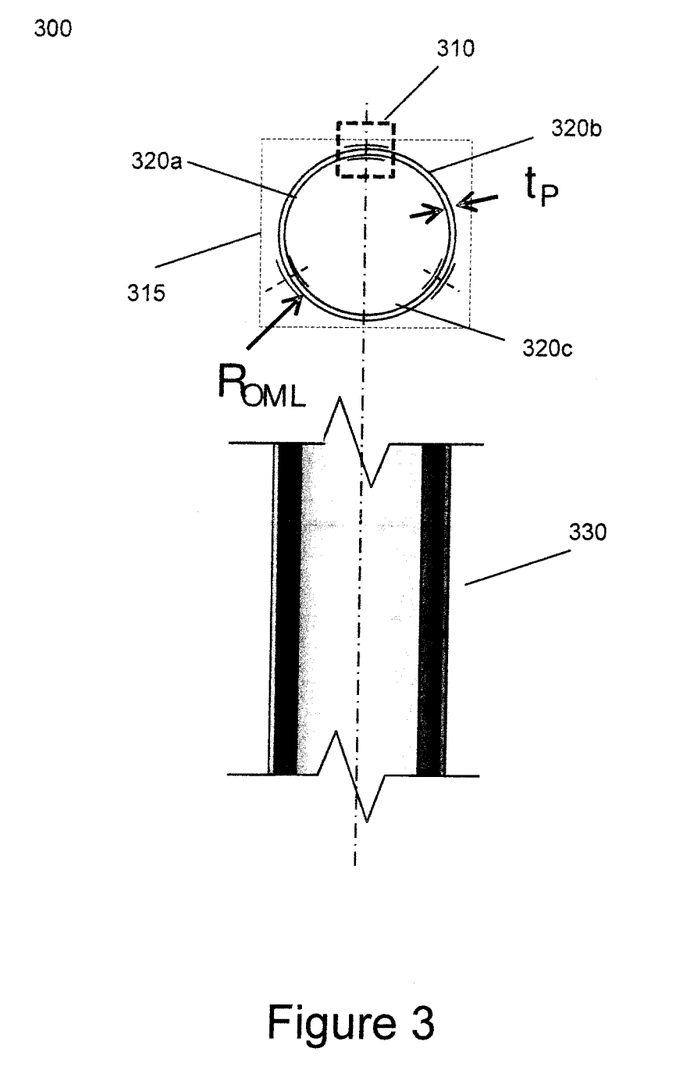
FIG. 3 is another exemplary block diagram of a composite sandwich structure according to aspects of the present disclosure.

FIG. 3 is another exemplary block diagram 300 of a composite sandwich structure according to aspects of the present disclosure. Further, FIG. 3 shows different perspectives of a cylindrical casing (315 and 330) of a heavy lift cargo vehicle such as an Ares V rocket. The cylindrical casing may be comprised of three curved, composite, sandwich structure (320a, 320b, and 320c) attached to each other using three joints 310.

Figure 4A:
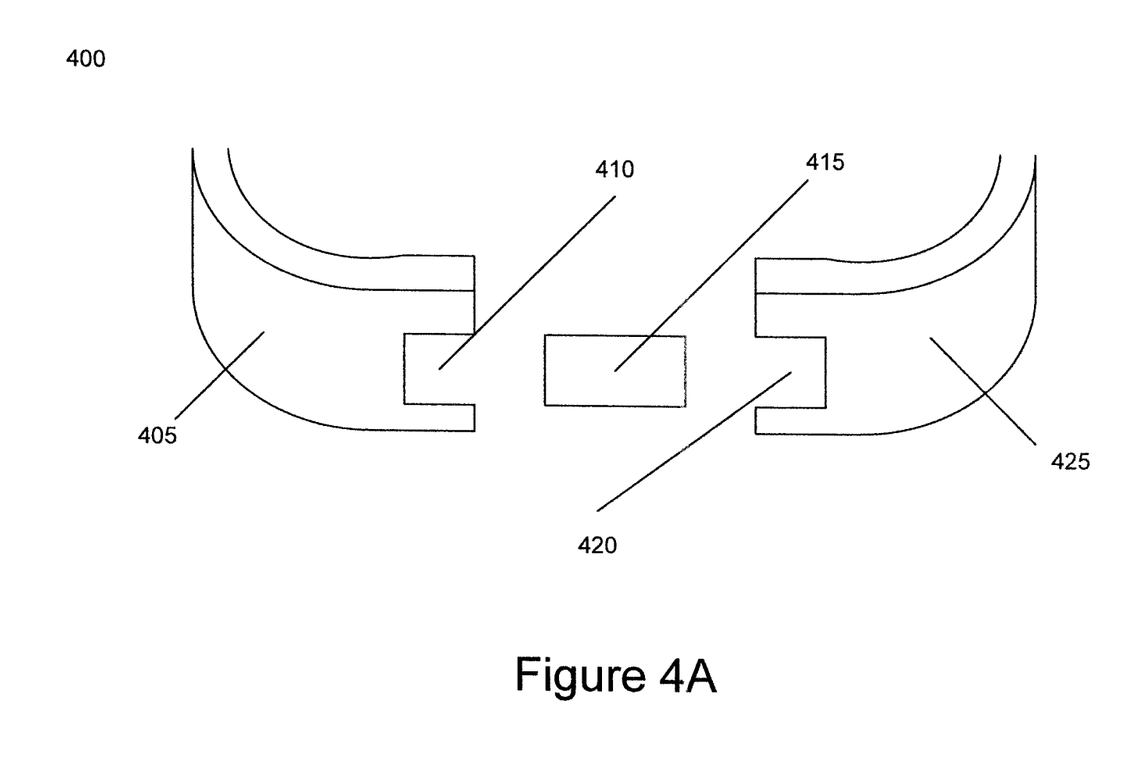
FIG. 4A and FIG. 4B are exemplary function block diagrams that illustrate an exemplary durable adhesive joint in accordance with aspects of the present disclosure.
Figure 4B:
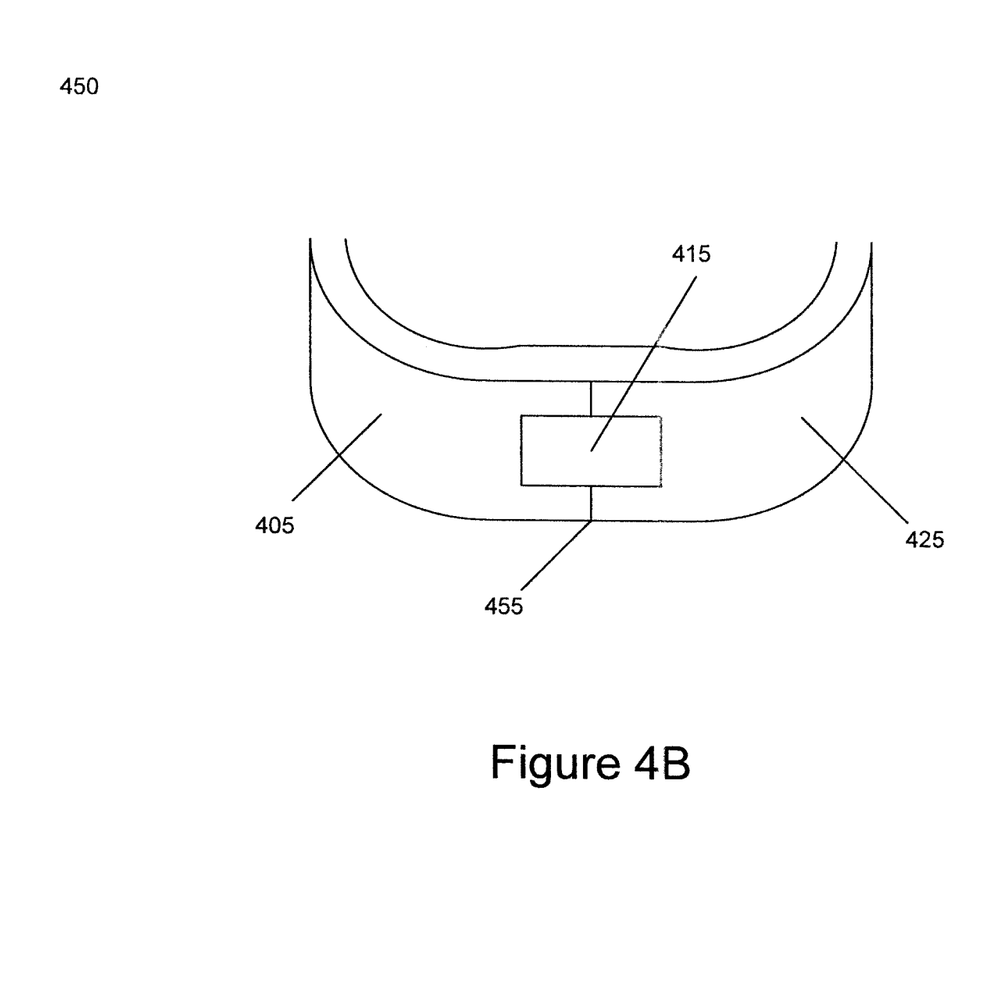

FIG. 4A and FIG. 4B are exemplary function block diagrams that illustrate an exemplary durable adhesive joint in accordance with aspects of the present disclosure. Referring to FIG. 4A, two curved, composite, sandwich panels (405 and 425) are being joined each curved panel (405 and 425) has a recessed area (410 and 420) to couple with an insert structure 415 as described in the present disclosure.

Referring to FIG. 4B, the curved panels (405 and 425) may be brought together during the joining process to enclose the insert structure 415. The joining process may create a durable redundant joint 455 using the insert structure. Further, during the joining process an adhesive fillet may be introduced to create or generate one or more primary bondlines and/or one or more redundant bondlines.

Figure 5A:
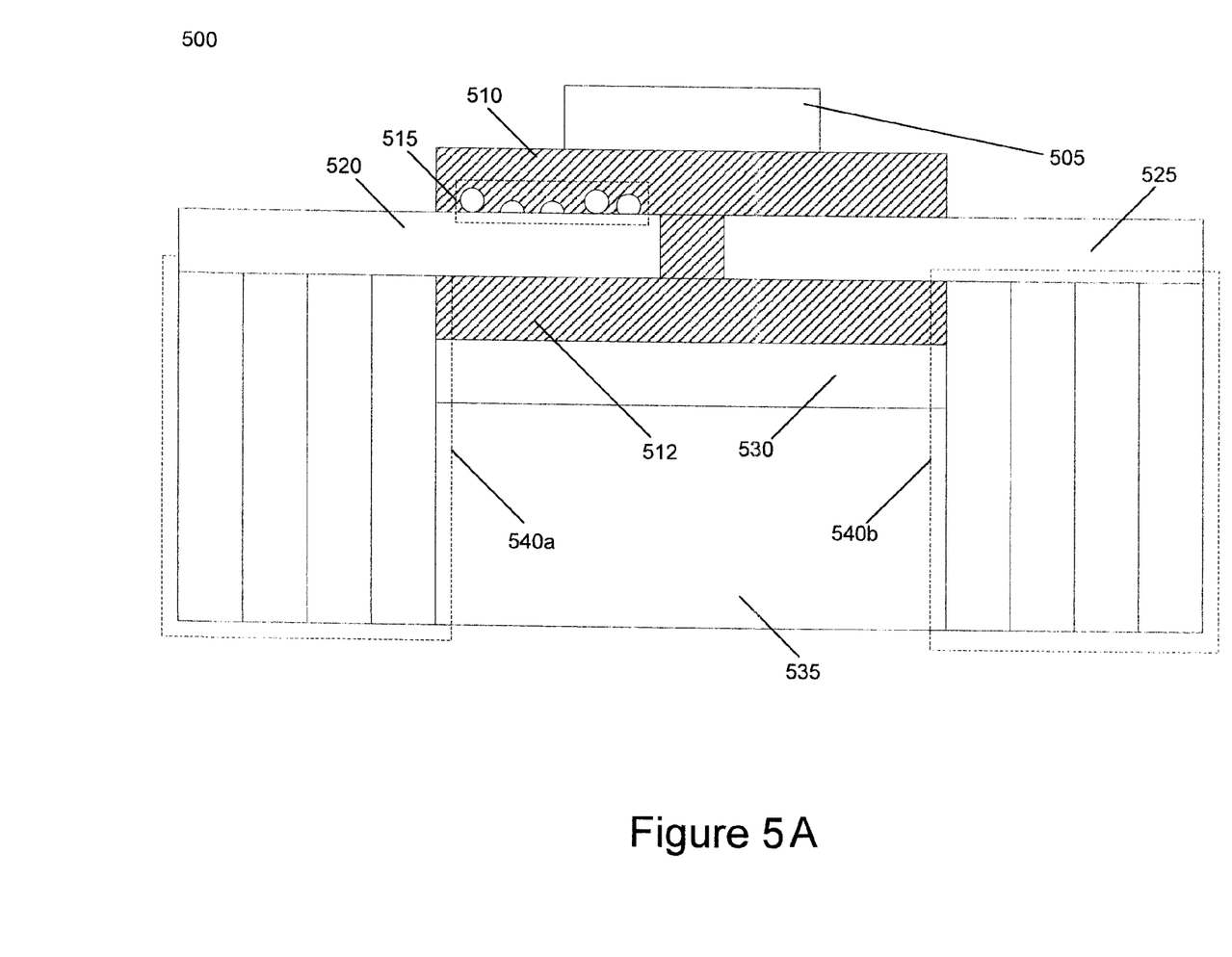
FIG. 5A is a block diagram illustrating an exemplary durable redundant joint provide a redundant load path to overcome manufacturing defects with an adhesive layer of the joint.

FIG. 5A is a block diagram illustrating an exemplary durable redundant joint 500 providing a redundant load path to overcome manufacturing defects 515 within an adhesive layer of the joint. Further, FIG. 5A shows a partial illustration of a durable redundant joint that includes a splice or splice plate 505, a primary bondline 510, and a redundant bondline 512. Further, the DRJ may include a face sheet 520 of the sandwich structure as well as the sandwich core material (540a and 540b) which may include an aluminum honeycomb core in some embodiments. In addition, the DRJ may include a preform insert structure that has an insert face sheet 530 and insert core material 535 which may be made of a dense foam material in some embodiments.

The failure traditional adhesively bonded joints is usually not a cohesive failure within the adhesive itself, but rather a failure at the surface between one of the elements (e.g. face sheet) and the adhesive itself as shown in FIG. 5. This is a manufacturing-induced phenomenon where, in some cases, understood mechanisms such as gaps or vacancies in the adhesive of the bondline act to severely discount the load-bearing capacity of joint. Considering that adhesively bonded joint configurations tend to lack redundancy, confidence in bond integrity had remained an issue.

However, aspects of the present disclosure overcome such manufacturing defects by incorporating a redundant bondline 512 as well as an insert perform (530 and 535) to reduce the load carried by the primary bondline. Another view of the DRJ is that the redundant bondline 512 as well as an insert preform (530 and 535) provides a redundant path to carry the load.

Figure 5B:
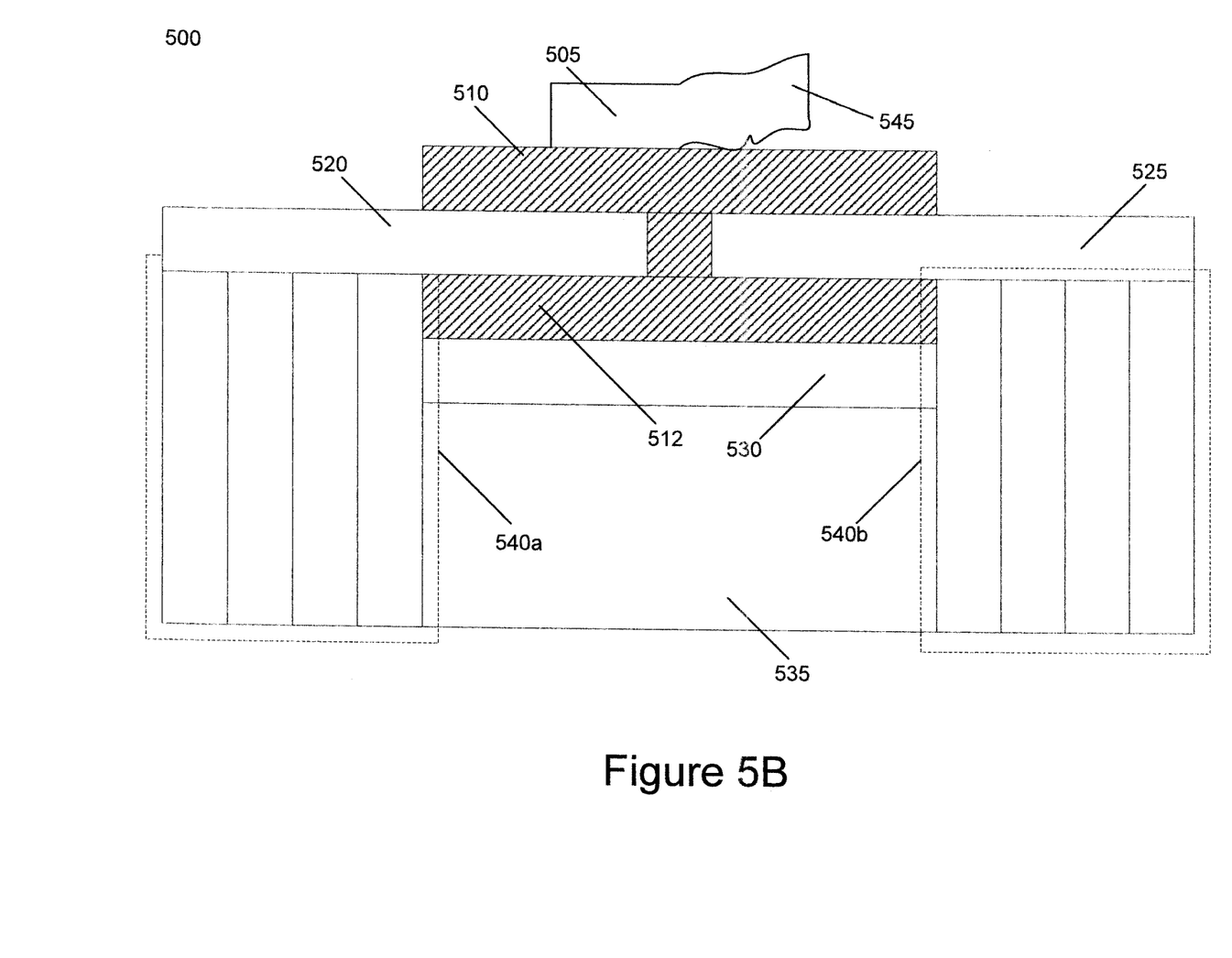
FIG. 5B is a block diagram illustrating an exemplary durable adhesive joint provide a redundant load path to delamination of a splice of the joint.

FIG. 5B is a block diagram illustrating an exemplary durable redundant joint 500 providing a redundant load path to delamination of a splice of the joint. FIG. 5B shows the splice 505 delaminating from the primary bondline 510. Such delamination may be caused by a foreign object impacting the joint at a critical angle thereby causing the deformity of the joint. Other ways delamination may occur includes repeated stress or impact on the joint. After such delamination, tradition adhesive joints would not be able to carry a specific load. However, due to the redundant bondline 512 and the insert preform that includes the insert face sheet 530 and the insert core material 535, the joint is capable of providing a redundant path to carry the specified load.

Figure 5C:
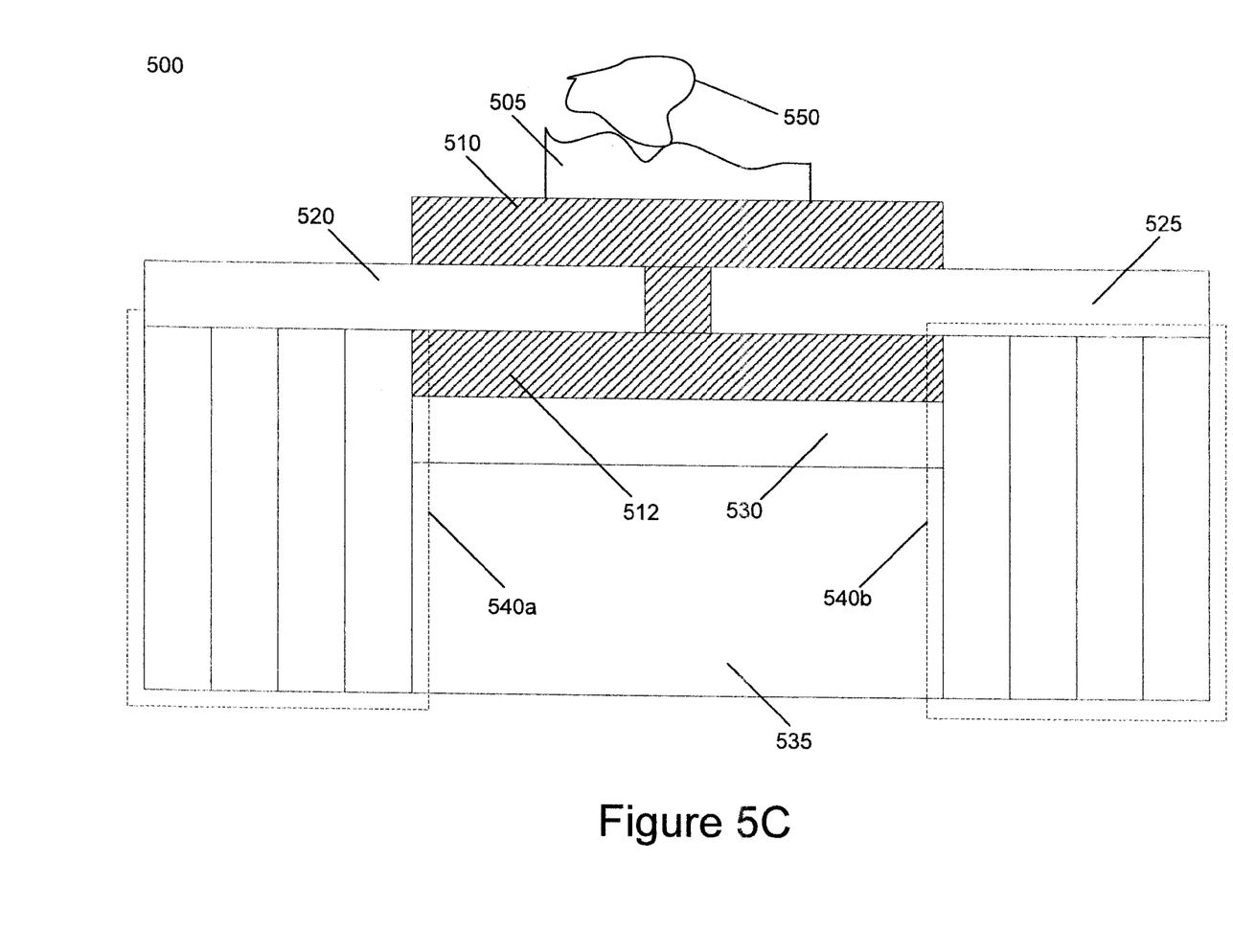
FIG. 5C is a block diagram illustrating an exemplary durable adhesive joint reducing structural fatigue.

FIG. 5C is a block diagram illustrating an exemplary durable redundant joint 500 reducing structural fatigue. Structural fatigue may be characterized as the progressive and localized structural damage that occurs when the joint is subject to repeated loading and unloading. If one of the repeated loads is above a certain threshold, then deformities in the joint may arise. Further, if additional loads are above such a threshold, then the existing deformities may increase in number and size. Such repeating loading and unloading resulting in deformities may cause the joint to fail. Fatigue life may be characterized as the number of stresses or loads the joint may be able to sustain before the joint fails to carry a specified load.

In addition, FIG. 5C shows one cycle of repeating loading as a foreign object 550 may impact the DRJ at the splice plate 505. In a traditional adhesive joint, the foreign object may deform the splice 505. Further, the impact may cause deformities in the primary bondline. Repeated stress or impact may increase the level of intensity and number of deformities such that the specified load cannot be carried by the traditional joint. However, aspects of the present disclosure describe a durable redundant joint that provides a redundant load for a specified load carried by the DRJ. The redundant load path is enabled by the redundant bondline 512, the insert face sheet 530, and the insert core material 535. With such a redundant load path, the fatigue life of the DRJ is longer than traditional or conventional joints. That is, the DRJ is capable of sustaining more impact or stress cycles than traditional or convention joints.

Figure 6:
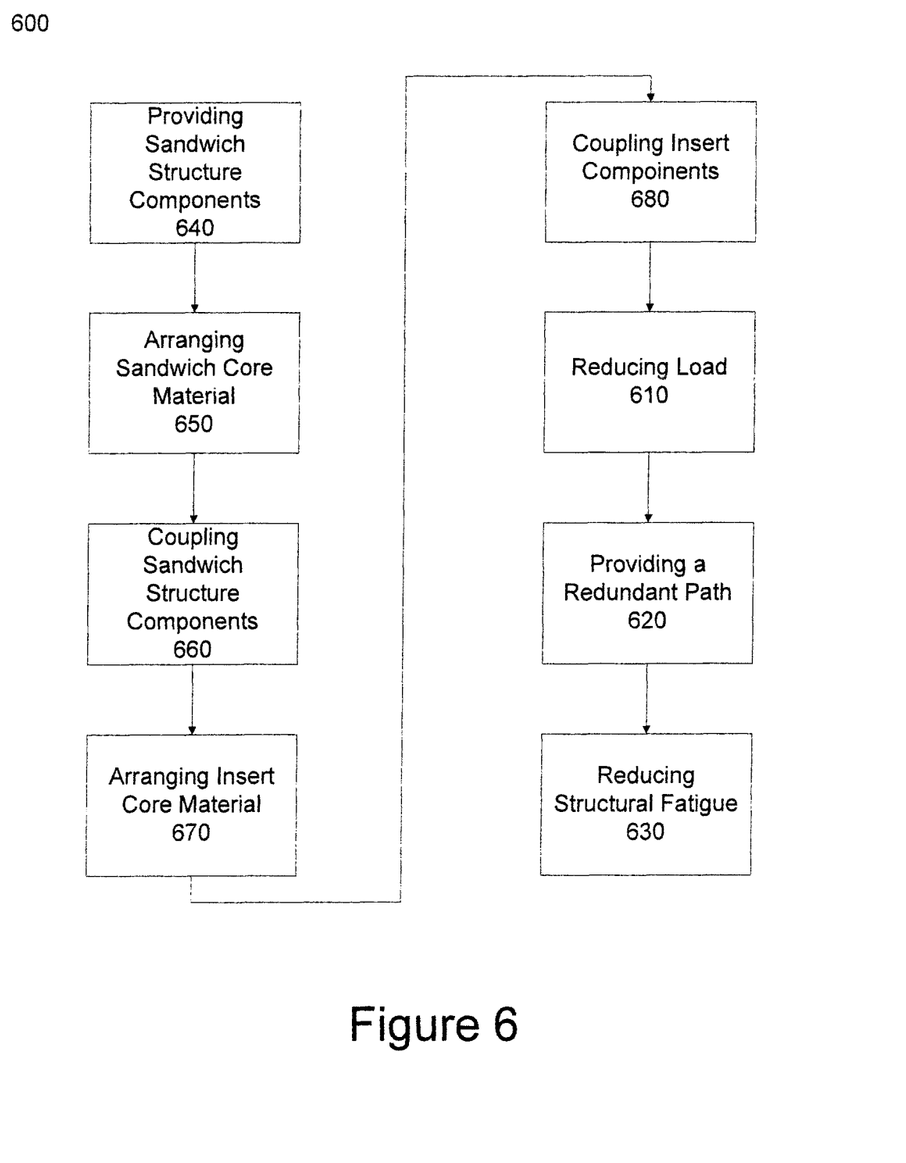
FIG. 6 is an exemplary flowchart showing an example method in accordance with aspects of the present disclosure.

FIG. 6 is an exemplary flowchart 600 showing an example method in accordance with aspects of the present disclosure. A person of ordinary skill in the art may understand that all the steps of the example method (610, 620, and 630) may be implemented or performed. The present disclosure describes that embodiments may implement or perform one or more of the steps of the example method. A durable redundant joint may reduce the load on the primary bondline of the joint, as shown in block 610. For example, a primary bondline may be coupled via an adhesive to a joint face sheet and a splice plate and is capable of carry a specified load. Further, the DRJ provides an insert perform that includes an insert core material and insert face sheet such that a redundant bondline may coupled to the insert face sheet and the joint face sheet. The redundant bondline as well as the insert including the insert face sheet and the insert care material may reduce the load on the primary bondline.

The example method may include a step of providing a first face sheet and a second face sheet, a first splice and a second splice, a sandwich core material and a first insert face sheet and a second insert face sheet and an insert core material, as shown in block 640. A further step may be arranging the sandwich core material between the first face sheet and the second face sheet, as shown in block 650. Additional steps may include coupling the first splice to the first face sheet using a first primary bondline as well as coupling the second splice to the second face sheet using a second primary bondline, as shown in block 660. Another step may include arranging the insert core material between the first insert face sheet and the second insert face sheet, as shown in block 670. A further step may be coupling the first face sheet to the first insert face sheet using a first redundant bondline as well as coupling the second face sheet to the second insert face sheet using a second redundant bondline, as shown in block 680. An additional step may be reducing load on a primary bondline using a redundant bondline.

A further step in the example method may be providing a redundant path for the load carried by the primary bondline. For example, the primary bondline may be coupled via an adhesive to a splice or splice plate. In traditional adhesive joints, an impact or stress may delaminate the splice plate such that the primary bondline may not be capable to carry a specified load. In such an embodiment, the redundant bond line, as well as the insert (including the insert face sheet and the insert core material), provide a redundant path for the load to be carried. In some embodiments, repeated stress or impact may increase the level of intensity and number of deformities such that the specified load cannot be carried by the traditional joint.

An additional step in the example method may be reducing structural fatigue of the joint, as shown in block 630. That is, increasing the fatigue life of the joint may occur due the redundant path to carry the load enabled by the redundant bondline, insert, insert face sheet, and insert core material.

Note that the functional blocks, methods, devices, and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at last the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for increasing durability of adhesively bonded joints in a sandwich structure, the apparatus comprising:
   a first face sheet and a second face sheet;
   an insert structure, the insert structure having a first insert face sheet, a second insert face sheet, and an insert core material; and
   a sandwich core material arranged between the first face sheet and the second face sheet, the sandwich core material having a recessed area capable of holding at least a portion of the insert structure;
   wherein the first face sheet is coupled to a first splice by a first primary bondline and the first face sheet is coupled to the first insert face sheet by a first redundant bondline;
   wherein the second face sheet is coupled to a second splice by a second primary bondline and the second face sheet is coupled to the second insert face sheet by a second redundant bondline; and
   wherein the first redundant bondline reduces a load on the first primary bondline and the second redundant bondline reduces a load on the second primary bondline.

2. The apparatus of claim 1, further comprising one or more additional insert structures, each such additional insert structure coupled to and substantially perpendicular to both the first insert face sheet and the first insert face sheet.

3. The apparatus of claim 1, further comprising an adhesive fillet included in one or more of the first primary bondline, the first redundant bondline, the first redundant bondline, and the first primary bondline.

4. The apparatus of claim 1, wherein the first redundant bondline provides a redundant load path for the load in the first face sheet.

5. The apparatus of claim 1, wherein the second redundant bondline provides a redundant load path for the load in the second face sheet.

6. The apparatus of claim 1, wherein the first redundant bondline is capable of reducing structural fatigue of the first splice of the joint by redistributing the load on the first primary bondline to the first redundant bondline and the insert structure.

7. The apparatus of claim 1, wherein the second redundant bondline is capable of reducing structural fatigue of the second splice of joint by redistributing the load on the second primary bondline to the second redundant bondline and the insert structure.

8. A system for increasing durability of adhesively bonded joints in a sandwich structure, the system comprising:
   one or more sandwich structures, each sandwich structure including:
      a first face sheet and a second face sheet;
      an insert structure, the insert structure having an first insert face sheet, a second insert face sheet, and an insert core material; and
      a sandwich core material arranged between the first face sheet and the second face sheet, the core having a recessed area capable of holding a portion of the insert structure;

wherein the first face sheet is coupled to a first splice by a first primary bondline and the first face sheet is coupled to the first insert face sheet by a first redundant bondline;

wherein the second face sheet is coupled to a second splice by a second primary bondline and the second face sheet is coupled to the second insert face sheet by a second redundant bondline; and wherein the first redundant bondline reduces load on the first primary bondline and the second redundant bondline reduces a load on the second primary bondline.

9. The system of claim 8, further comprising one or more additional insert structures, each such additional insert structure coupled to and substantially perpendicular to both the first insert face sheet and the second insert face sheet.

10. The system of claim 8, further comprising an adhesive fillet included in one or more of the first primary bondline, the first redundant bondline, the second redundant bondline, and the second primary bondline.

11. The system of claim 8, wherein the first redundant bondline provides a redundant load path for the load on the first primary bondline.

12. The system of claim 8, wherein the second redundant bondline provides a redundant load path for the load on the second primary bondline.

13. The system of claim 8, wherein the first redundant bondline is capable of reducing structural fatigue of the joint by redistributing the load from the first splice to first face sheet of insert and the insert structure.

14. The system of claim 8, wherein the second redundant bondline is capable of reducing structural fatigue of the joint by redistributing the load on the second primary bondline to second redundant bondline and the insert structure.

15. The system of claim 8, further comprising a joint, wherein the joint is a coupling of a first sandwich structure to a second structure such that a first portion of the insert structure is surrounded by a first sandwich core material of the first sandwich structure and a second portion of the insert structure is surrounded by a second sandwich core material of the second sandwich structure.

16. The system of claim 8, wherein a geometry of the one or more sandwich structures is selected from the group consisting of curved sandwich structures and flat sandwich structures.

\* \* \* \* \*